United States Patent [19]
Morgan

[11] 3,764,652
[45] Oct. 9, 1973

[54] SOLVENT EXTRACTION OF GERMANIUM FROM ALUM SOLUTION

[75] Inventor: Kenneth A. Morgan, Arlington Heights, Ill.

[73] Assignee: Universal Oil Products Company, Des Plaines, Ill.

[22] Filed: Feb. 25, 1972

[21] Appl. No.: 229,567

[52] U.S. Cl.................. 423/89, 423/494, 423/472, 423/312 ME
[51] Int. Cl........................ C01g 17/00, C01g 17/04
[58] Field of Search.................... 423/89; 23/312 R, 23/312 ME; 75/101 BE

[56] References Cited
UNITED STATES PATENTS
3,902,454   9/1959   Moore .......................... 23/312 ME
3,214,239   10/1965   Hazen et al..................... 75/101 BE
2,859,092   11/1958   Bailes et al. .................... 23/312 ME

OTHER PUBLICATIONS

Grdemic et al., "Nuclear Science Abstracts," Vol. 16, No. 11, 1962, p. 1694.

Cenai et al., "Journal of Chromatography," Vol. 24, 1966, pp. 383–401.

Primary Examiner—Herbert T. Carter
Attorney—J. R. Hoatson, Jr. et al.

[57] ABSTRACT

Germanium is extracted from an alum solution utilizing a hydrocarbon solution of a monosubstituted phosphoric acid as the extractant. The hydrocarbon solution is then back extracted with hydrofluoric acid.

7 Claims, No Drawings

SOLVENT EXTRACTION OF GERMANIUM FROM ALUM SOLUTION

A variety of commercially significant hydrocarbon conversion processes involving decyclization, dehydrocyclization, isomerization, aromatization, hydrogenation, dehydrogenation, etc., of hydrocarbons have heretofore been effectively catalyzed at varied reaction conditions utilizing a catalyst consisting essentially of a platinum group metal composited with a refractory inorganic oxide carrier material. Of the platinum group metals, i.e., platinum, palladium, rhodium, ruthenium, osmium and iridium, platinum is the most commonly employed. Typically, the catalyst will comprise platinum composited with an alumina carrier material. More recently, it has been shown that the activity, selectivity and/or stability of said catalyst is promoted with respect to one or more of the aforementioned hydrocarbon conversion reactions by including a germanium component in the catalyst composite.

The catalysts so employed invariably become deactivated and regeneration is required if the catalyst is to perform its intended function in an economical manner. Deactivation may result from any one of a number of conditions peculiar to a particular hydrocarbon conversion process. Usually, deactivation results from the accumulation of carbonaceous matter on the catalyst whereby the hydrocarbon reactant stream is denied access to the catalytic components of the catalyst composite. While the catalyst can be suitably regenerated one or more times by burning the carbonaceous matter therefrom under controlled conditions, each such regeneration produces a catalyst somewhat less stable than its predecessor. Eventually, regeneration is no longer economically feasible and the spent catalyst must be replaced with fresh catalyst. The high cost of the platinum and germanium metals coupled with limited availability precludes a disposition of the spent catalyst without effecting a recovery of substantially all of the platinum and germanium metals. This is so although each of the platinum and germanium metals may comprise as little as 0.1 wt. % of the total catalyst composite.

It is common practice to recover the platinum group metal component by initially treating the spent catalyst with sulfuric acid whereby the alumina carrier material is digested leaving a platinum group metal-containing residue and an alum or aluminum sulfate solution. Preferably, although not necessarily, the spent catalyst is burned free of carbonaceous matter prior to the acid treatment. In the event that carbonaceous matter is recovered with the residue, the carbonaceous matter is burned therefrom prior to further treatment. When, as is most often the case, the platinum group metal is platinum, it is generally preferred to recover the platinum as chloroplatinic acid to facilitate handling, storage, and subsequent reuse in the manufacture of fresh catalyst. Thus, platinum is recovered from the carbon-free residue on treating the residue with aqua regia. The resulting mixture is subjected to filtration and the filtrate boiled down to remove solvent and yield a chloroplatinic acid concentrate.

When, as herein contemplated, the catalyst further contains a germanium component, substantially all of the germanium is found in a soluble form in the alum solution and it is one of the objects of this invention to present a novel method of recovering germanium from said alum solution. Although the alum may contain only minute quantities of a soluble germanium form, it has been found that substantially all of the germanium can be effectively recovered from said solution by solvent extraction means. For example, one embodiment of this invention is in a method of recovering germanium from an alum solution, which method comprises: (a) fixing the free acid content of said alum solution at at least about 0.05 molar; (b) extracting the alum solution by admixing the same with a hydrocarbon solution of a substituted phosphoric acid represented by the structural formula

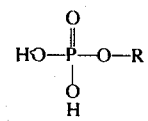

where R is a hydrocarbyl radical selected from the group consisting of alkyl, cycloalkyl, alkenyl, cycloalkenyl, aryl, alkaryl, and aralkyl; (c) separating the germanium-containing hydrocarbon phase from the resulting mixture and extracting the same with an aqueous hydrofluoric acid solution; and (d) separating the aqueous phase of the resulting mixture and recovering germanium therein.

Other objects and embodiments of this invention will become apparent in the following detailed specification.

In accordance with the method of this invention, germanium is initially extracted from an alum solution utilizing a hydrocarbon solution of a substituted phosphoric acid represented by the structural formula

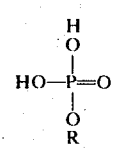

where R is a hydrocarbyl radical selected from the group consisting of alkyl, cycloalkyl, alkenyl, cycloalkenyl, aryl, alkaryl and aralkyl. While in practice, a commercially available mixture of approximately equal amounts of mono and bis(2-ethylhexyl) phosphoric acids has proved to be a particularly suitable extractant, the mono(2-ethylhexyl) phosphoric acid component of the mixture has been found to be the active extractant. However, other monosubstituted phosphoric acids containing from about 2 to about 20 carbon atoms, preferably from about four to about 12 carbon atoms, are suitably employed. For example, a monoalkyl phosphoric acid such as monoethyl phosphoric acid, monopropyl phosphoric acid, monoisopropyl phosphoric acid, monobutyl phosphoric acid, mono-sec-butyl phosphoric acid, mono-t-butyl phosphoric acid, mono(2-methylbutyl) phosphoric acid, monopentyl phosphoric acid, mono(2-methylpentyl) phosphoric acid, mono(3-methylpentyl) phosphoric acid, monohexyl phosphoric acid, mono(2-methylhexyl) phosphoric acid, mono(3-methylhexyl) phosphoric acid, mono(2-ethylhexyl) phosphoric acid, mono(3-ethylhexyl) phosphoric acid, monoheptyl phosphoric acid, mono(2-methylheptyl) phosphoric acid, mono(2-ethylheptyl) phosphoric acid, monooctyl phosphoric acid, mono(2-methyloctyl) phosphoric acid, mono(2- ethyloctyl) phosphoric acid, and the like may be suitably employed. Suitable monosubstituted phosphoric acids also include the monocycloalkyl phosphoric acids, such as monocyclopentyl phosphoric acid; monoalkenyl and monocycloalkenyl phosphoric acids such as mono(1hexenyl) phosphoric acid and monocyclohexenyl phosphoric acid; and monoaryl phosphoric acids, for example monophenyl phosphoric acid; monoalkaryl phosphoric acids, for example mono(p-tolyl) phosphoric acid; and also monoalkaryl phosphoric acids such as monobenzyl phosphoric acid.

While the commercially available monosubstituted phosphoric acids suitable for use herein, for example mono(2-ethylhexyl) phosphoric acid, may contain various concentrations of the corresponding di- and tri-substituted phosphoric acids, for example bis(2-ethylhexyl) phosphoric acid, the monosubstituted phosphoric acid has been found to be the active extractant with respect to the extraction of germanium from alum solution.

The monosubstituted phosphoric acid is utilized in hydrocarbon solution, the hydrocarbon solvent being, as a practical matter, a substantially non-volatile hydrocarbon. Suitable hydrocarbon solvents thus include dodecane, benzene, toluene, xylene, kerosine and the like, although hydrocarbon solvents such as pentane, 2,2-dimethylpentane, 2,3-dimethylpentane, 2,4-dimethylpentane, 3,3-dimethylpentane, 3-ethylpentane, 3-ethyl-2-methylpentane, 3-ethyl-3-methylpentane, 3-methylpentane, hexane, 2,3-dimethylhexane, etc., and mixtures or blends thereof may be employed. Mono(2-ethylhexyl) phosphoric acid in n-dodecane solution is particularly useful.

As heretofore mentioned, the alumina carrier material is digested in sulfuric acid with the formation of alum or aluminum sulfate solution. In the extraction of germanium from said alum solution utilizing a monosubstituted phosphoric acid in hydrocarbon solution as the extractant, the distribution coefficient has been found to be directly proportional to the free sulfuric acid content of the alum solution, free acid being that in excess of the amount required to convert the alumina to aluminum sulfate. Pursuant to the present invention, the free sulfuric acid content of the alum solution is established at at least about 0.05 molar. A molar excess of free sulfuric acid commensurate with a stable alum solution, generally not in excess of about 0.60 molar, is preferred. While the method of this invention is particularly useful to recover germanium from an acidic alum solution as herein described, the method is operable to recover germanium from acidic solutions in general.

One preferred embodiment of the present invention relating to a method of recovering germanium from alum solution comprises fixing the free sulfuric acid content of said alum solution at from about 0.05 to about 0.60 molar; extracting the alum solution by admixing the same with an n-dodecane solution of mono(2-ethylhexyl) phosphoric acid; separating the germanium-containing hydrocarbon phase from the resulting mixture and back extracting the same with an aqueous hydrofluoric acid solution. At least about 1 molar hydrofluoric acid in aqueous solution is suitably employed at ambient temperature, say from about 20° C to about 25° C., although the extraction efficiency of hydrofluoric acid improves with temperature and with concentration up to about 16 molar.

While the germanium may be recovered in any desired form, it is preferably recovered as germanium tetrachloride — a form suitable for reuse in the manufacture of fresh catalyst. One method comprises first concentrating the hydrofluoric acid extract (hexafluorogermanic acid) and treating the concentrate in admixture with gaseous hydrogen chloride and/or concentrated hydrochloric acid. The resulting germanium tetrachloride is readily distilled overhead from the reaction mixture.

Solvent extraction in accordance with the method of this invention can be effected in a batch type of operation although a continuous type of operation is preferable. It is contemplated that in normal operations the liquid solutions will be contacted under extraction conditions in any one of a number of contacting devices known to the art. Contacting devices which can be utilized in a continuous operation include the rotating disc contactor, and also countercurrent extractor columns containing spaced trays or plates, or inert packing such as beryl saddles, to promote intimate contact of the reactant streams. Subsequent phase separation is facilitated utilizing a commercial coalescer.

The following example is presented in illustration of the method of this invention and is not intended as an undue limitation on the generally broad scope of the invention as set out in the appended claims.

EXAMPLE I

In this example, a 26 wt. % aluminum sulfate solution (alum containing 0.425 grams per liter of germanium and 2.18 wt. % free sulfuric acid (0.293 M) was utilized to demonstrate a specific embodiment of the method of this invention. The selected monosubstituted phosphoric acid was mono(2-ethylhexyl) phosphoric acid used as a commercially available mixture of 51 wt. % mono and 49 wt. % di(ethylhexyl) phosphoric acids. This mixture was employed as a 40 wt. % solution in n-dodecane. About 5 volumes of the alum solution was thoroughly and intimately mixed in contact with one volume of the hydrocarbon solution for 5 minutes at room temperature. Thereafter, alum was allowed to settle out and the hydrocarbon phase was separated. The alum was extracted five times in this manner and the extracts combined. The hydrocarbon extract was subsequently mixed in contact with a 2 molar aqueous hydrofluoric acid solution in a 4:1 volume ratio. The mixing was at 20°–22° C. for about 5 minutes. The aqueous phase was then allowed to settle out and the hydrocarbon phase decanted therefrom. The hydrofluoric acid extraction was repeated five times and the extracts combined. Analysis of the hydrofluoric acid extract indicated about 99.8 % recovery of germanium as hexafluorogermanic acid.

I claim as my invention:

1. A method of recovering germanium from an acidic alum solution which comprises:
   a. fixing the free acid content of said alum solution at at least about 0.05 molar;
   b. admixing the acidic solution with a hydrocarbon solution of a substituted phosphoric acid represented by the structural formula:

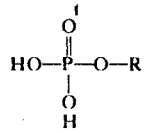

where R is a hydrocarbyl radical containing from about two to about 20 carbon atoms selected from the group consisting of alkyl, cycloalkyl, alkenyl, cycloalkenyl, aryl, alkaryl and aralkyl;
  c. separating the hydrocarbon phase from the resulting mixture and backextracting with hydrofluoric acid to recover germanium therefrom.

2. The method of claim 1 further characterized in that said acidic solution is an alum solution with a free sulfuric acid content of at least about 0.05 M.

3. The method of claim 1 further characterized with respect to step (b) in that said substituted phosphoric acid is an alkyl substituted phosphoric acid.

4. The method of claim 1 further characterized with respect to step (b) in that said substituted phosphoric acid is an alkyl substituted phosphoric acid wherein the alkyl substituent contains from about four to about 12 carbon atoms.

5. The method of claim 1 further characterized with respect to step (b) in that said substituted phosphoric acid is mono(2-ethylhexyl) phosphoric acid.

6. The method of claim 2 further characterized in that said free sulfuric acid content is from about 0.05 to about 0.60 M.

7. The method of claim 1 further characterized with respect to step (b) in that said hydrocarbon solution of a substituted phosphoric acid is a n-dodecane solution thereof.

* * * * *